United States Patent [19]

Sasaki et al.

[11] Patent Number: 4,969,047

[45] Date of Patent: Nov. 6, 1990

[54] PROCESSOR FOR DETECTING THE NUMBER OF BIT TIMES IN PORTIONS OF A BINARY VIDEO SIGNAL TO PRODUCE A CORRESPONDING NUMBER OF WIDTH ADJUSTABLE DOT PULSES

[75] Inventors: Akira Sasaki; Akiyoshi Hakoyama; Takeshi Kato, all of Hitachi, Japan

[73] Assignee: Hitachi, Ltd., Tokyo, Japan

[21] Appl. No.: 416,506

[22] Filed: Oct. 3, 1989

[30] Foreign Application Priority Data

Oct. 5, 1988 [JP] Japan .................................. 63-249861

[51] Int. Cl.⁵ ........................ H04N 1/036; H04N 1/23; G01D 15/14
[52] U.S. Cl. .................................... 358/296; 346/108; 346/76 L
[58] Field of Search ........................ 358/296, 300, 302; 346/108, 160, 76 L

[56] References Cited

U.S. PATENT DOCUMENTS

| | | | |
|---|---|---|---|
| 4,661,861 | 4/1987 | Rutherford | 358/302 |
| 4,742,363 | 5/1988 | Shiraishi | 346/108 |
| 4,835,545 | 5/1989 | Mager | 346/108 |

*Primary Examiner*—Bruce A. Reynolds
*Assistant Examiner*—Scott A. Rogers
*Attorney, Agent, or Firm*—Antonelli, Terry, Stout & Kraus

[57] ABSTRACT

An apparatus for processing a binary video signal carrying information of dots to be printed. The binary video signal is at a relatively higher or lower level for the whole of each bit time to constitute a unit portion of the binary video signal. The unit portion of the binary video signal at one of the levels is representative of one dot. The apparatus includes a first detector for detecting a start of a length of each of those parts of the binary video signal which are at the one level, a second detector connected with the first detector for determining the number of unit portions contained in each part of the video signal, a generator connected with the second detector for producing one or more dot pulses for each part of the video signal, each of the dot pulses having a pulse width smaller than that corresponding to the bit time, the number of the one dot pulses being the same as that of the determined number of unit portions, and a controller connected with the generator for controllably adjusting the pulse width of the dot pulses.

4 Claims, 12 Drawing Sheets

F I G. 6
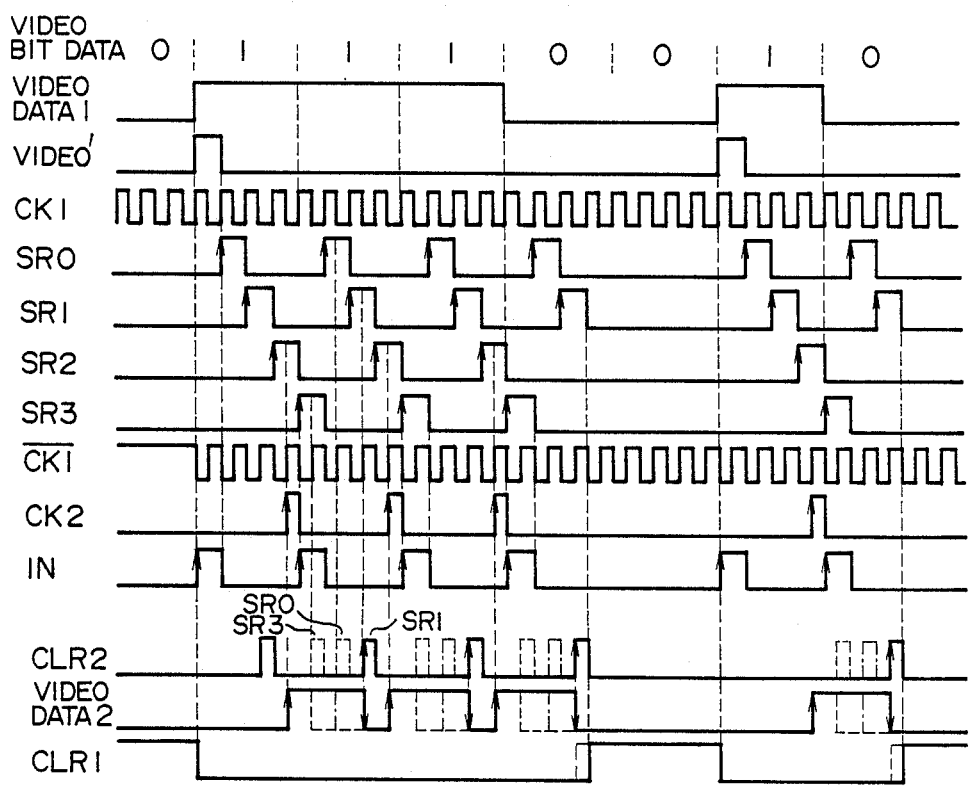

F I G. 10
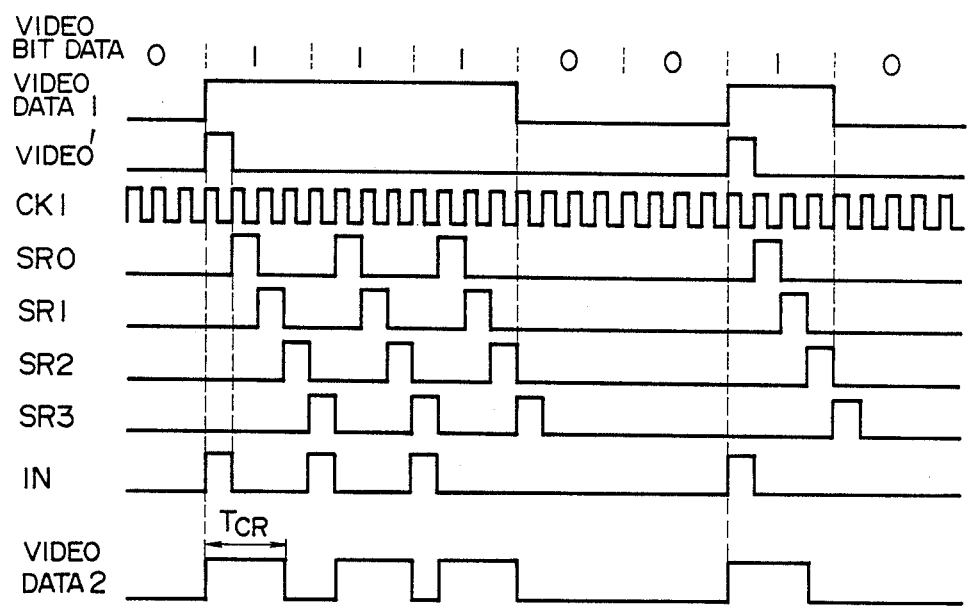

PROCESSOR FOR DETECTING THE NUMBER OF BIT TIMES IN PORTIONS OF A BINARY VIDEO SIGNAL TO PRODUCE A CORRESPONDING NUMBER OF WIDTH ADJUSTABLE DOT PULSES

BACKGROUND OF THE INVENTION

The present invention relates to a semiconductor laser printer, and more particularly to the processing of a binary video signal carrying information of dots to be printed.

In the conventional printer, a binary video signal for "printing" one dot on a light sensitive medium or for irradiation of the light sensitive medium with a laser beam for one dot includes a unit portion which has a relatively higher lever for the whole of a bit time or a duty factor of 100%, as has been disclosed by, for example, JP-B-62-59508 (corresponding to JP-A-61-234168 laid open on Oct. 18, 1986). Accordingly, in the case where consecutive dots are to be printed in a main scanning direction, a binary video signal supplied from an information processing apparatus to the printer are formed by consecutive unit portions each having a duty factor of 100% or a relatively higher level is continuously maintained. Therefore, if the spot of a laser beam has not a longitudinally elongated shape with the dimension of the spot in a lateral direction (or scanning direction) larger than a half of the pitch of dots to be printed, there is a tendency that the contrast potential (or sensitivity) of the light sensitive medium or drum upon beam irradiation for printing of one dot becomes low as compared with that of the light sensitive medium upon beam irradiation for continuous printing of two or more dots with a result that the one dot is lightly printed. In order to suppress this tendency, the conventional printer employs a method in which an isolated dot is detected to increase a current to be supplied to a laser oscillator, thereby improving the quality of image or print.

However, the correction method in which the current of the laser oscillator is instantaneously increased has the drawbacks in that the number of highspeed constant current switching circuits is doubled, that work for adjustment of fluctuations of the slope efficiency of the laser oscillator is correspondingly doubled, and that a laser output power is liable to fluctuate owing to fluctuations of temperatures and/or adjustments of two constant current switching circuits, since the output power of the laser oscillator (especially, a semiconductor laser oscillator having a high sensitivity) encounters a large change for a minute change of a photocurrent in the laser oscillator.

FIG. 1 shows, as to the conventional printer, a relationship between a binary video signal (Video Data) including a signal part for one dot and a signal part for three consecutive dots, the scanning of a laser beam spot 1 (in an x-direction), and light energy distributions (2, 3 and 4) on a light sensitive recording medium or drum. In this conventional printer, the longitudinal and lateral dimensions $x_1$ and $y_1$ of one dot "printed" on the light sensitive recording medium are different from each other or the dot formed has not a substantially circular shape, as is apparent from FIG. 1. In the figure, $x_2$ denotes the lateral dimension for the three consecutive dots. $E_A$ and $E_B$ represent beam spot energies, and $E_{thx}$ and $E_{thy}$ represent the energy thresholds of the light sensitive recording medium. $E_{AP1}$ is a peak value of the energy distribution curves 2 and 3.

According to one method of compensating for the different longitudinal and lateral dimensions of one dot, the duty factor of a signal part for one dot is made smaller than that of a signal part for two or more dots to satisfy $x'_1 = y_1$, as shown in FIG. 2. However, in this method, a light energy distribution on the light sensitive recording medium is changed from the light energy distribution 2 in FIG. 1 to a light energy distribution 5 in FIG. 2. Therefore, the conventional printer employs a method in which a laser driving current is increased for only a signal part for one dot to obtain a light energy distribution 6. In FIG. 2, $E_{AP2}$ represents a peak value of the energy distribution curve 5.

SUMMARY OF THE INVENTION

An object of the present invention is to provide a binary video signal processing apparatus in which printing can be made with a high resolution.

Another object of the present invention is to provide a printer in which printing can be made at a high speed and with a high resolution.

According to one aspect of the present invention, since a binary video signal carrying information of dots to be printed includes unit portions each of which is at a relatively higher or lower level for the whole of each bit time, a signal part including one or plural unit portions representative of one or plural dots is converted to a signal part which has an individual dot pulse for each dot, the number of dot pulses being the same as that of dots.

Since a binary video signal for printing, on a light sensitive recording medium, dots running consecutively in a main scanning direction of a laser beam is converted into a signal which includes an individual dot pulse for each dot having any duty factor, there are provided the effects that a difference in light energy distribution on the light sensitive recording medium between a single dot and consecutive dots is minimized, thereby improving the quality of image and that the provision of an individual pulse signal facilitates a gradational control in the unit of one dot. As a result, the present invention is effective for realization of a high quality of image.

BRIEF DESCRIPTION OF THE DRAWINGS

FIG. 6 is a timing chart for explaining the operation of the binary video signal processing apparatus shown in FIG. 4.

FIG. 10 is a timing chart for explaining the operation of the binary video signal processing apparatus shown in FIG. 9.

DESCRIPTION OF THE PREFERRED EMBODIMENTS

Figure 1:
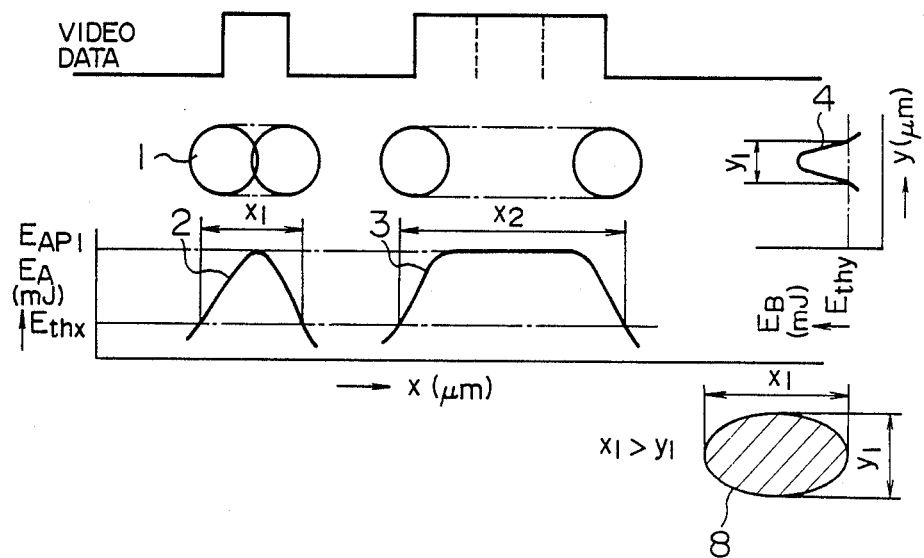
FIGS. 1 and 2 are diagrams for explaining the operation of the conventional semiconductor laser printer.
Figure 2:
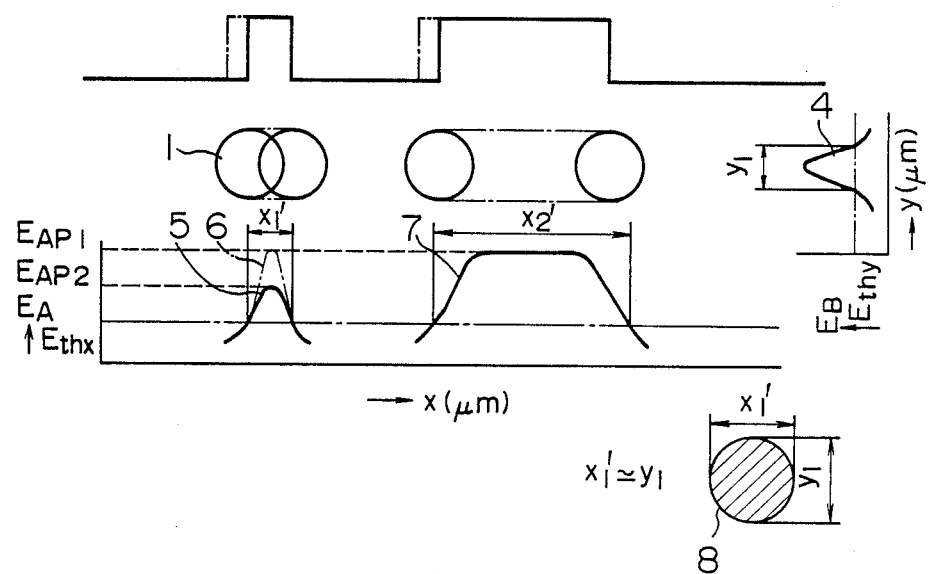
Figure 3:
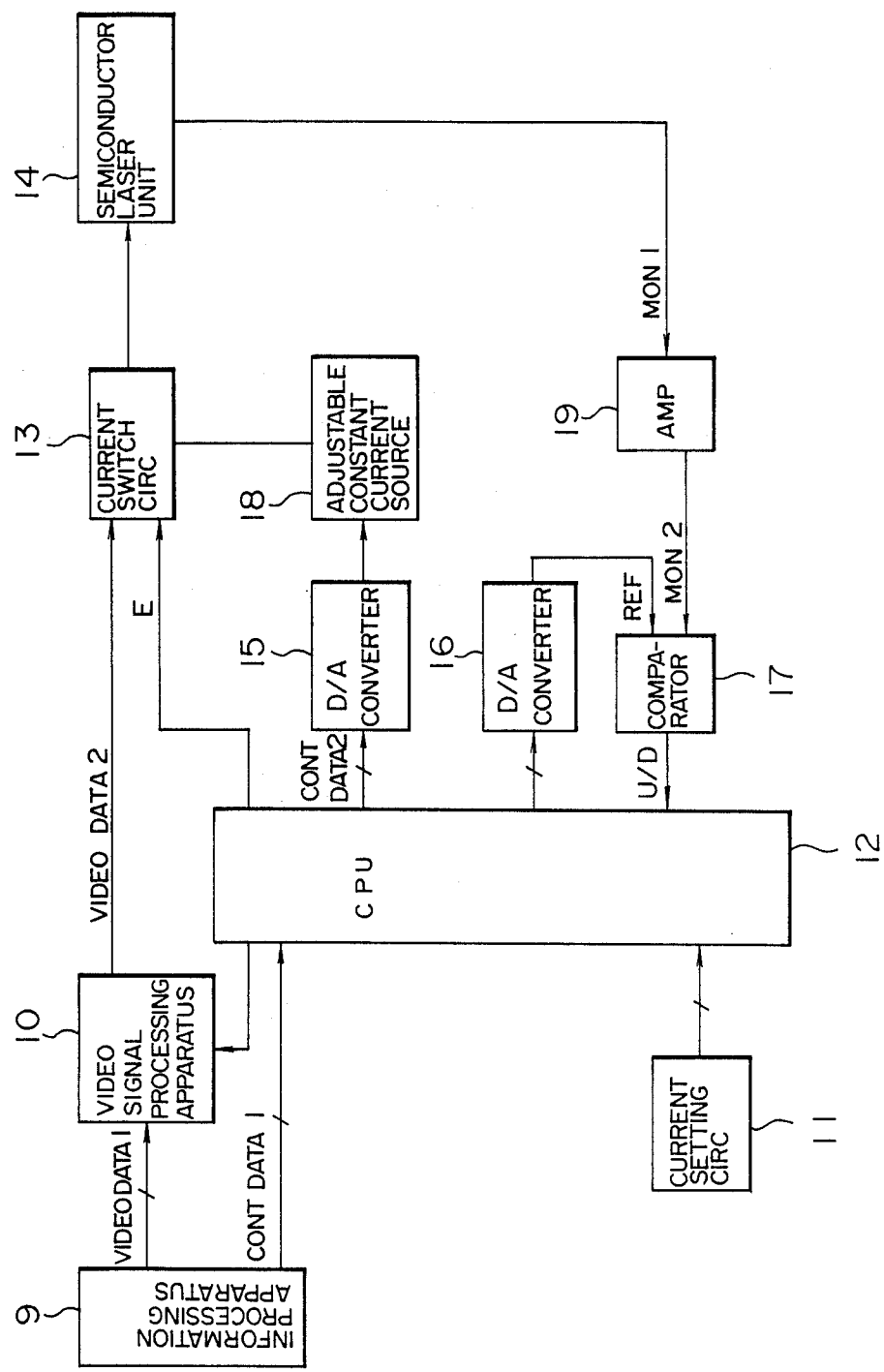
FIG. 3 is a block diagram of the whole of a laser beam control system in a semiconductor laser printer according to an embodiment of the present invention.

A semiconductor laser printer according to an embodiment of the present invention will now be explained by virtue of FIG. 3.

A first binary video signal Video Data 1 inputted to a laser printer from an information processing apparatus 9 such as a host computer is supplied to a video signal processing apparatus 10 for conversion into a second binary video signal Video Data 2. The second binary video signal Video Data 2 is inputted to a current switch circuit 13 which drives a semiconductor laser unit 14. The switch circuit 13 is brought into either an operating or non-operating condition in accordance with the level of a control signal E outputted from a CPU 12 (for example, 8-bit CPU). The control signal E defines a start point and an end point of one line. The CPU 12 selects the level of the control signal E on the basis of a control signal Cont Data 1 supplied from the information processing apparatus 9 to the CPU 12.

An operation current to be supplied to the semiconductor laser unit 14 is set by a D/A converter 15 and an adjustable constant current source 18. The determination and alternation of the set value of the operation current are made by inputting the contents of a current setting circuit 11 to the CPU 12. The operation current determines the dot size i.e., the depth of or the degree of shade of dot print. The CPU 12 causes a second D/A converter 16 to output data of a reference value REF. A laser diode and monitor diode are incorporated into the laser unit 14. An output signal MON1 of the monitor diode is amplified by an amplifier 19 which in turn provides an amplified signal MON2. The output MON2 of the amplified 19 and the reference value data REF from the D/A converter 16 are inputted to a comparator 18 which in turn supplies a comparison output signal U/D as a feedback signal to the CPU 12.

For example, in the case where a value by the current setting circuit 11 is set to increase the operation current, data to increase the value of the reference value data REF is outputted from the CPU 12 to the D/A converter 16. If the comparator 17 is constructed to provide the comparison output signal UD which is at a high ("H") level when the voltage value of the reference value data REF is greater than the signal MON2, a control signal Cont Data 2 having an increased value is outputted from the CPU 12 to the D/A converter 15 to increase the current value of the adjustable constant current source 18. The above operation is continued until the comparison output signal U/D of the comparator 17 is brought into a low ("L") level.

Next, the construction and operation of the video signal processing apparatus 10 will be explained in detail by virtue of FIGS. 4 to 6. The same reference symbol is used for designating each signal terminal and a signal inputted to the terminal.

Figure 4:
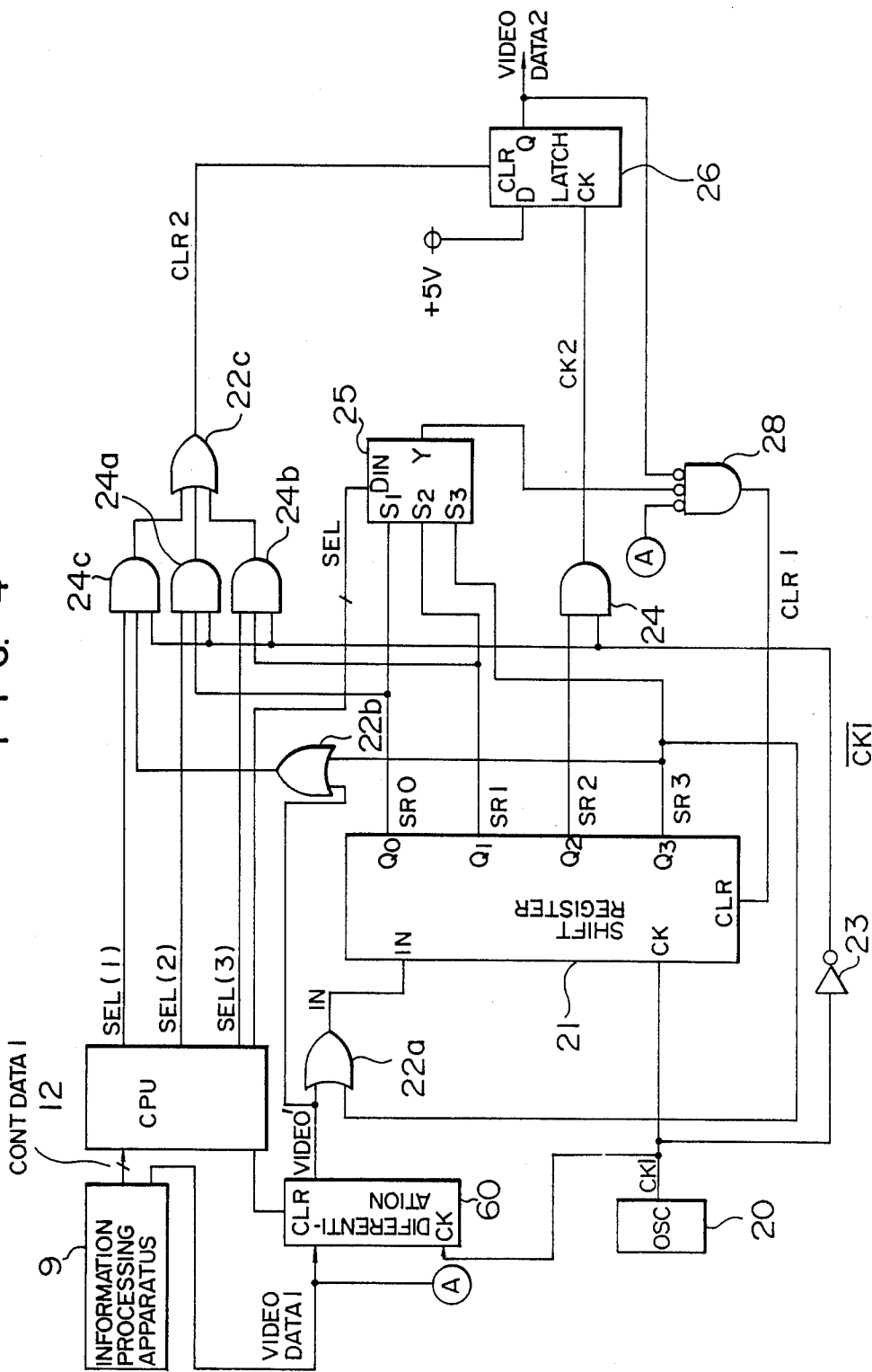
FIG. 4 is a diagram showing a binary video signal processing apparatus according to an embodiment of the present invention.

Referring to FIG. 4, a first binary video signal Video Data 1 supplied from the information processing apparatus 9 to the printer is inputted to a differentiation circuit 60. The differentiation circuit 60 is also inputted at a clock terminal thereof with a clock signal CK1 which is the output of an oscillator circuit 20. From the first video signal Video Data 1 and the clock signal CK1 is produced a differentiated signal Video' of the first video signal Video Data 1.

Figure 5A:
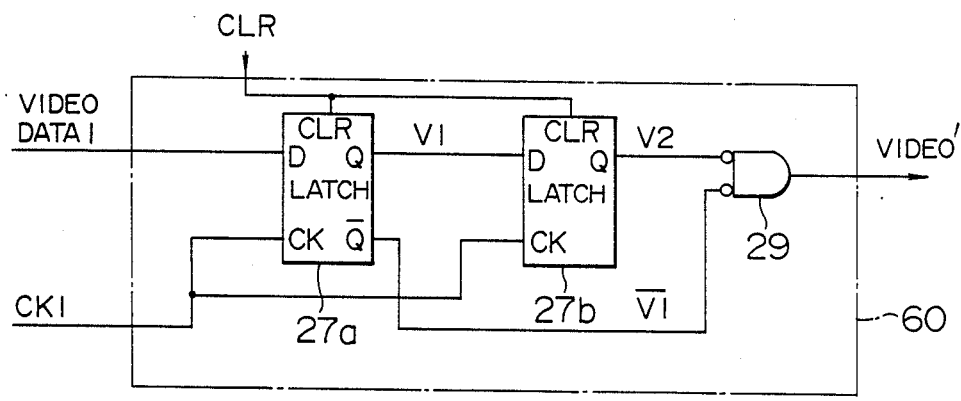
FIGS. 5A and 5B are a diagram of a differentiation circuit in the binary video signal processing apparatus shown in FIG. 4 and a timing chart of the operation of the differentiation circuit, respectively.

FIG. 5A shows a specific example of the differentiation circuit 60. In the differentiation circuit 60, the change to rise (or alternately fall) of a pulse in the first binary video signal Video Data 1 is detected by means of the clock signal CK1 having a frequency higher than (for example, four to eight times as high as) the bit frequency (for example, 5 MHz to 10 MHz) of the first video signal Video Data 1 so that upon change to rise (or alternately fall) of the first video signal Video Data 1 the video signal Video' is brought into an "H" level only during a time corresponding to one period of the clock signal CK1.

Figure 5B:
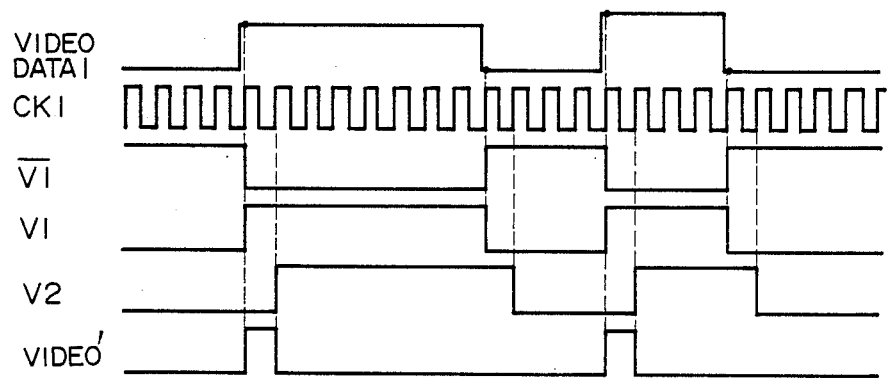

The timing for the first video signal Video Data 1, the clock signal CK1, output signals $V_1$, $\overline{V}_1$ and $V_2$ of latches 27a and 27b, and the video signal Video' are shown in FIG. 5B. Reference numeral 29 in FIG. 5A designates an AND element which receives inverted signals of $V_2$ $\overline{V}_1$.

The detection of the change to rise of the first video signal Video Data 1 is made in FIG. 5A, assuming that the laser diode is activated or a laser beam is emitted when the video signal is at a high ("H") level by which each dot is represented. The video signal Video' assumes a differentiated version of the first video signal Video Data 1.

Returning to FIG. 4, the video signal Video' is inputted to an OR element 22a together with an output signal SR3 of the fourth stage of a four-stage shift register 21. An output signal of the OR element 22a is inputted to a serial data input terminal IN of the shift register 21. This input signal IN is sent into the respective stages $Q_0$ to $Q_3$ of the four-stage shift register 21 by the clock signal CK1 and a feedback of the output signal SR3 of the fourth stage of the shift register 21 to the input terminal IN thereof is made through the OR element 22a.

The output signals SR0, SR1 and SR3 of the first, second and fourth stages of the shift register 21 are inputted to a selector 25 for determining a timing with which the shift register 21 is to be cleared. One of the output signals SR0, SR1 and SR3 of the shift register 21 is selected by a selection signal SEL supplied from the CPU 12 to the selector 25 so that the shift register 21 is cleared with the timing for the selected shift register output. Namely, a clear signal CLR1 is generated on the basis of the first binary video signal Video Data 1, the output of the selector 25 and the second binary video signal Video Data 2. During a period of time when the first binary video signal Video Data 1 is at a "L" level or includes no dot information, the shift register 21 is cleared.

The output signals SR0, SR1 and SR3 of the shift register 21 are also inputted to an AND element 24a, an AND element 24b and an AND element 24c through an OR element 22b, respectively. The AND elements 24a, 24b and 24c receive $\overline{CK1}$ in common and receives selection signals SEL(2), SEL(3) and SEL(1) from the CPU 12, respectively. The outputs of the AND elements 24a, 24b and 24c are inputted to an OR element 22c to produce a clear signal CLR2 which determines the timing of an input to a clear terminal CLR of a latch 26. Namely, the input signal CLR2 to the clear terminal CLR of the latch 26 is a timing signal which changes the level of a second binary video signal Video Data 2 from "H" to "L", as shown in a timing chart of FIG. 6. The clear signal CLR2 defines the pulse width or duty factor of a dot pulse in the second binary video signal Video Data 2 corresponding to each unit portion in the first binary video signal Video Data 1 representative of one dot.

A output signal Y of the selector 25 and the first and second video signals Video Data 1 and Video Data 2 are inputted in inverted forms thereof to an AND element 28 to produce the clear signal CLR1 which is inputted to a clear terminal CLR of the shift register 21 and determines the timing of clearing of the output of the shift register 21. The clear signal CLR1 provides a variable timer by which the clearing of the shift register 21 is released in accordance with a time when the "H" level of the first video signal Video Data 1 is continued, as shown in FIG. 6.

The operations of the above-mentioned parts or components will now be further explained in reference to the timing chart shown in FIG. 6.

In the shown example, it is assumed that the first binary video signal Video Data 1 inputted from the information processing apparatus 9 has a signal part which includes three unit portions representative of three consecutive dots and a signal part which includes one unit portion representative of only one dot. Namely, the binary dot data is "01110010".

This video signal Video Data 1 is inputted to the differentiation circuit 60 to detect a start of the length of each signal part or a level change of the signal Video Data 1 (a level change from "L" to "H" in the case of FIG. 6), thereby obtaining the video signal Video'. The video signal Video' is sent into the shift register 21 by the clock signal CK1 to obtain the output signals SR0, SR1, SR2 and SR3 from the respective stages of the shift register 21. In the shown example, since the frequency of the clock signal CK1 is selected to be four times as high as the bit frequency of the first binary video signal Video Data 1, the number of stages of the shift register 21 is 4 (four). The output of an AND element 24 applied with an inverted version of the clock signal CK1 and the output signal SR2 of the third stage of the shift register 21 provides a clock signal CK2 which in turn is inputted to the latch 26. An output of the OR element 22a applied with the video signal Video' and the output signal SR3 of the fourth stage of the shift register 21 provides the input signal IN which in turn is inputted to the shift register 21. Accordingly, the number of pulses contained in the output signal SR2 of the third stage of the shift register 21 producing a clear release period of the clear signal CLR1 indicates the number of unit portions contained in each signal part of the first binary video signal Video Data 1 representative of a dot(s). Namely, each signal part of the inputted or first binary video signal Video Data 1 including one or more unit portions each of which is at a "H" level representative of a dot and has a duty factor of 100%, is converted into a signal part (as shown by the waveform of the second binary video signal Video Data 2 in FIG. 6) including dot pulses which correspond to the respective dots and the number of which is equal to the number of dots. The duty factor of the dot pulse can be selected by the selection signals SEL(1) to (3) supplied from the CPU 12. This selection of duty factor makes it possible to optimize the quality of print.

Figure 7:
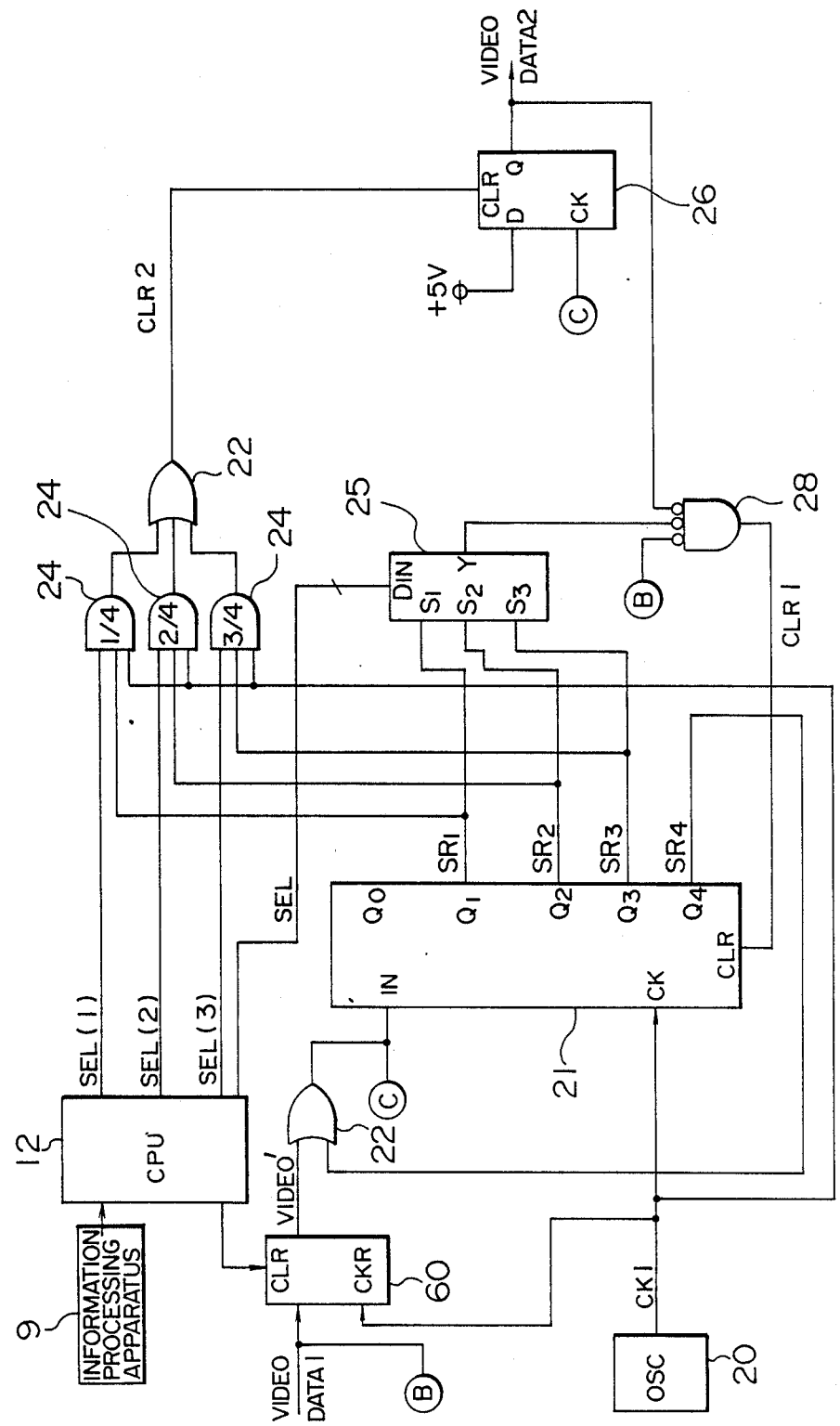
FIG. 7 is a diagram showing a binary video signal processing apparatus according to another embodiment of the present invention.
Figure 8:
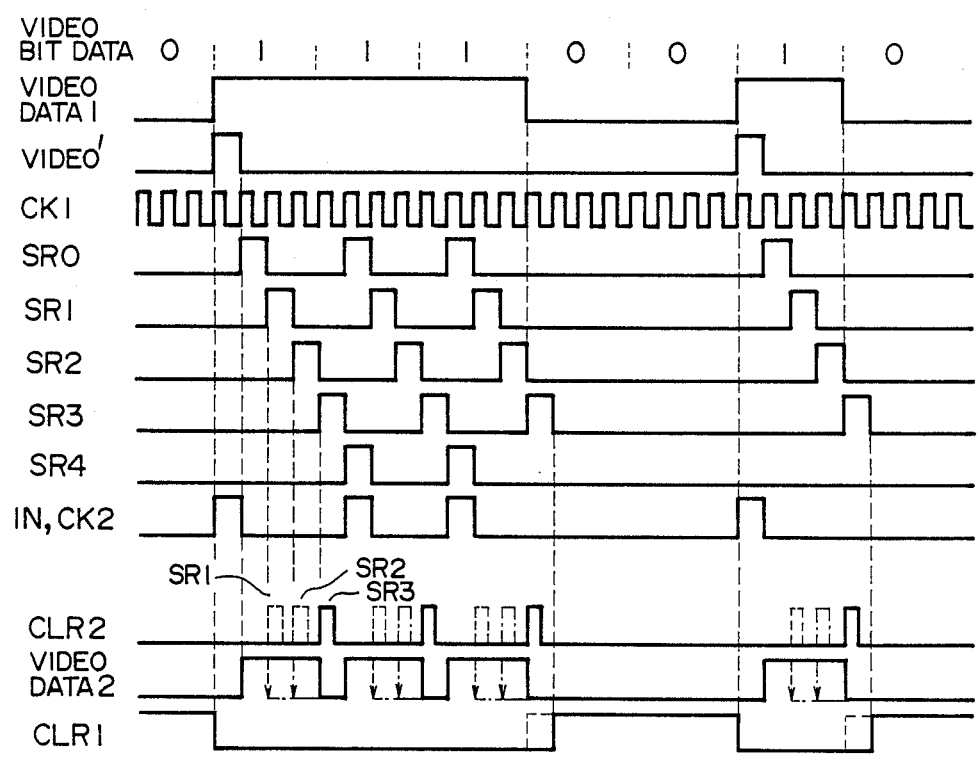
FIG. 8 is a timing chart for explaining the operation of the binary video signal processing apparatus shown in FIG. 7.

A video signal processing apparatus as another embodiment having a function equivalent to the apparatus shown in FIG. 4 is shown in FIG. 7, and operation waveforms thereof is shown in FIG. 8.

The embodiment shown in FIGS. 7 and 8 has quite the same function as the embodiment shown in FIGS. 4 and 6, excepting that the timings of the first and secondary binary video signals Video Data 1 and Video Data 2 (or a time lag between the signals Video Data 1 and Video Data 2) is different between both the embodiments.

In the embodiments shown in FIGS. 4 and 7, the selector 25 and signals SEL and SR0–SR2 supplied to the selector 25 may be omitted. In that case, the waveform of the clear signal CLR1 now rises up with a timing as shown by dotted lines in FIGS. 6 and 8.

Figure 9:
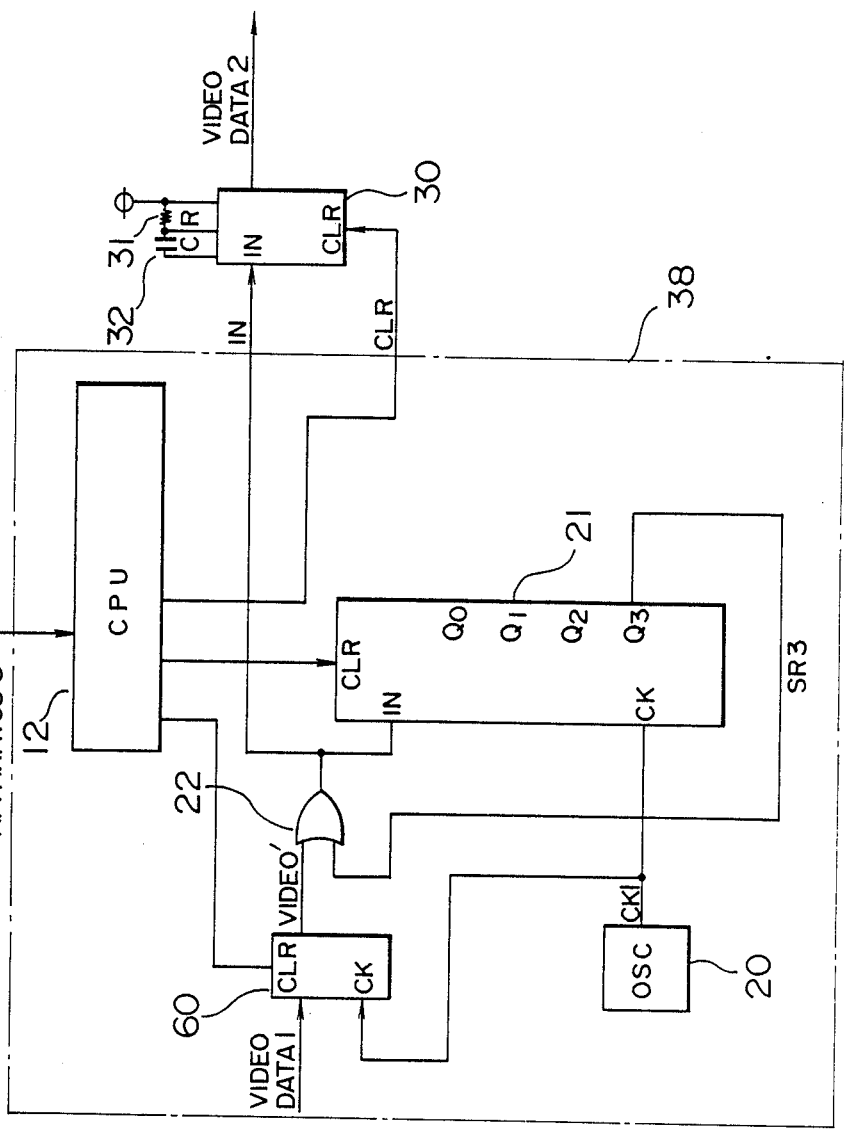
FIG. 9 is a diagram showing a binary video signal processing apparatus according to a further embodiment of the present invention.

FIG. 9 shows an example in which a timer including a monostable multivibrator 30, a capacitor (C) 32 and a resistor (R) 31 is used as means for adjusting the duty factor of each dot pulse in the above-mentioned second binary video signal. As can be seen from FIG. 10, an input signal IN produced by the output of an OR element 22 supplied with the video signal Video' from the differentiation circuit 60 and an output signal SR4 from the fifth stage of the shift register 21 is a pulse timing signal which causes the emission of a laser beam or is representative of one dot. Accordingly, the input signal IN is inputted to the monostable multivibrator 30 to produce the second binary video signal Video Data 2 so that the video signal Video Data 2 takes an "H" level during only a time $T_{CR}$ determined by the value C of the capacitor 32 and the value R of the resistor 31, as shown in FIG. 10. Namely, this example has a merit that the optimum value of $T_{CR}=C.R$ can be freely selected.

Next, an embodiment provided with a timer constructed by the above-mentioned monostable multivibrator will be explained in reference to FIGS. 11 and 12.

Figure 11:
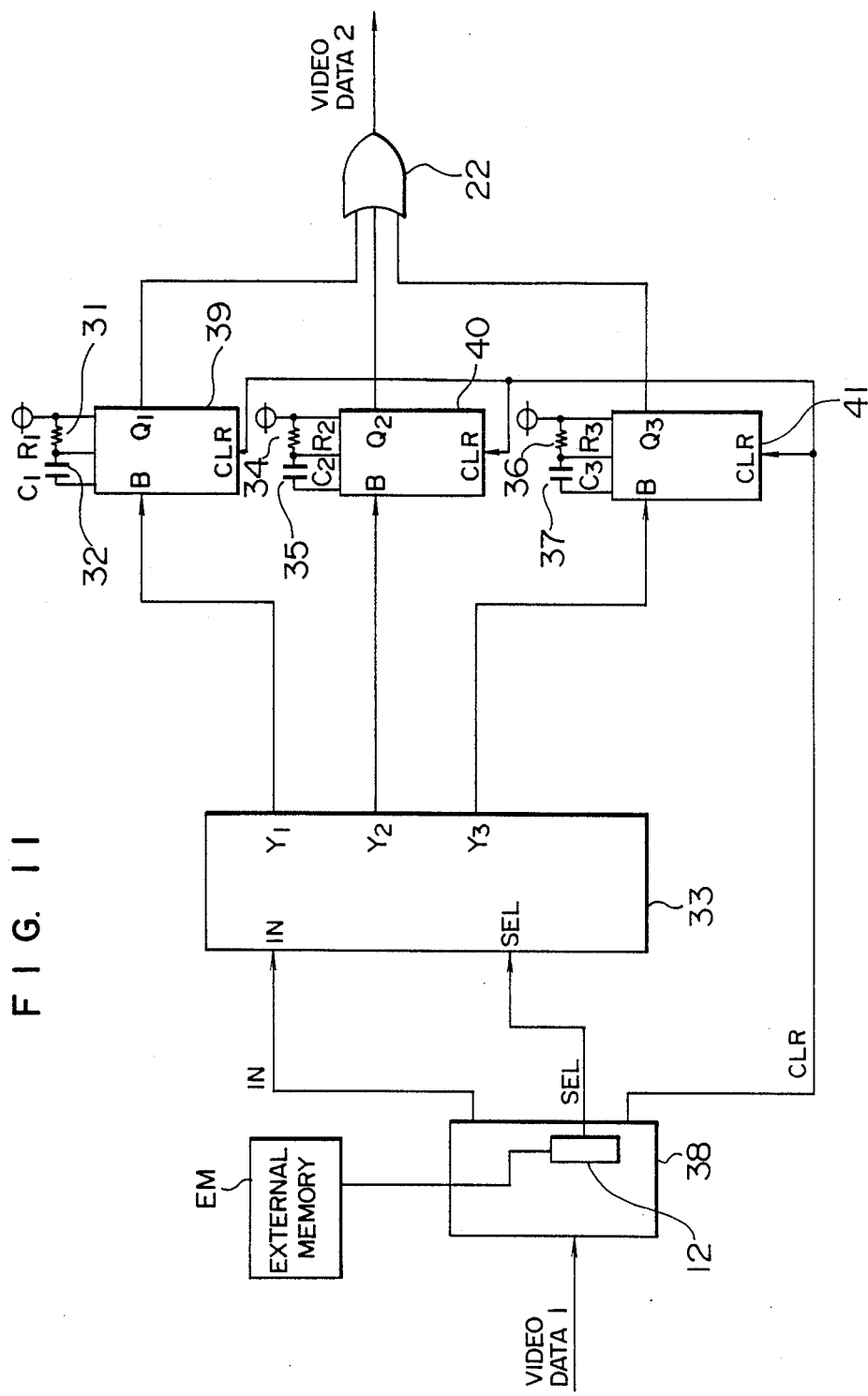
FIG. 11 is a diagram showing a binary video signal processing apparatus according to a still further embodiment of the present invention.

In FIG. 11, a first binary video signal Video Data 1 is inputted to a video signal processor 38 which in turn outputs an input signal IN and a clear signal CLR. A selection signal SEL is inputted from a CPU 12 to a selector 33 so that either one of output terminals $Y_1$, $Y_2$ and $Y_3$ of the selector 33 can be selected. The outputs from the output terminals $Y_1$, $Y_2$ and $Y_3$ are respectively inputted to monostable multivibrators 39, 40 and 41 which have different timer values. The respective timer values (or inversion times) of the monostable multivibrators 39, 40 and 41 are determined by the values $R_1$, $R_2$ and $R_3$ of resistors 31, 34 and 36 and the values $C_1$, $C_2$ and $C_3$ of capacitors 32, 35 and 37. Three kinds of pulse widths can be selected for a dot pulse by the selection signal SEL from the CPU 12. For example, the setting is made to provide $C_1R_1<C_2R_2<C_3R_3$.

Figure 12:
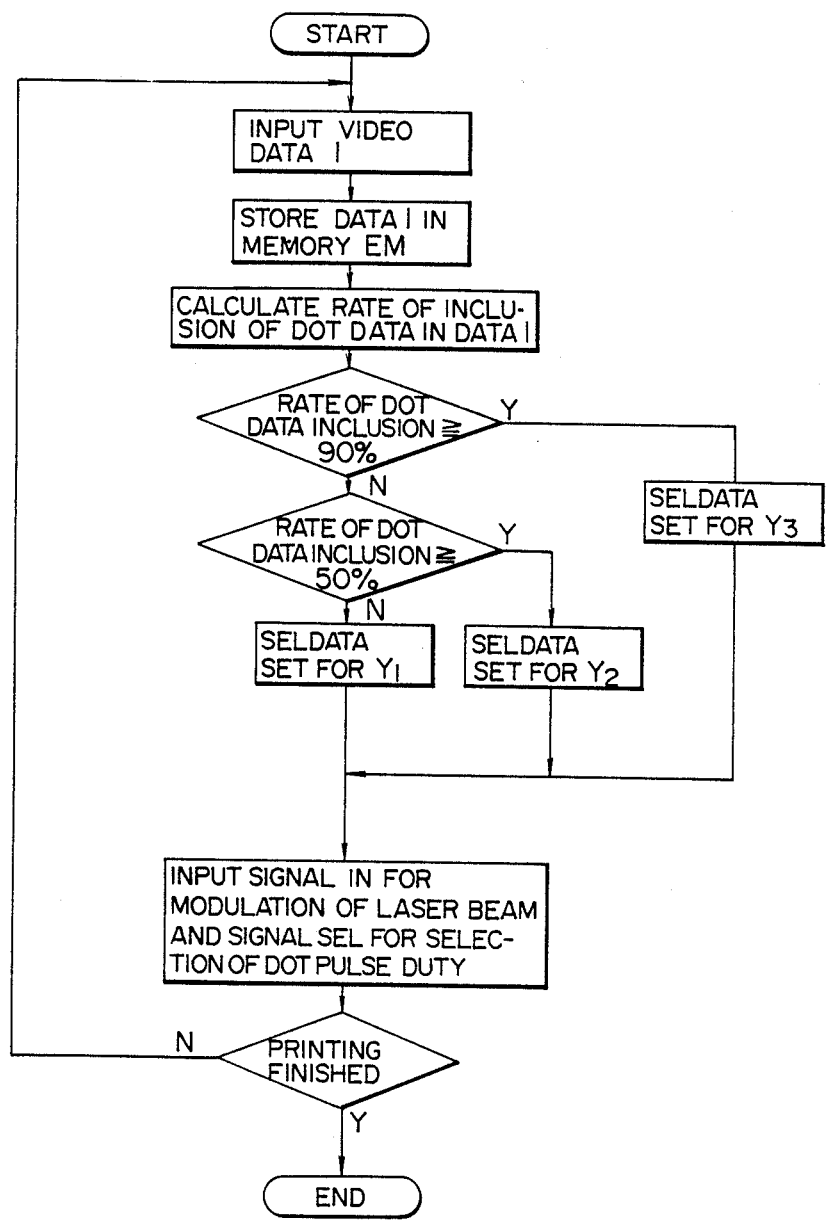
FIG. 12 is a flow chart of a control made in the binary video signal processing apparatus shown in FIG. 11.

FIG. 12 shows a flow chart of a control made in the embodiment shown in FIG. 11.

A first binary video signal Video Data 1 inputted is stored in an external memory EM and the rate of inclusion of dot data in the inputted video signal Video Data 1 is calculated by the CPU 12, so that selection data SELDATA($Y_1$) to ($Y_3$) and the set values for the timer values are changed in accordance with the magnitude of the rate of dot data inclusion, thereby changing the pulse width or duty factor of a dot pulse. Namely, the present embodiment enables a simple density gradation and is therefore very effective for provision of the improved quality of image upon graphic printing.

We claim:

1. An apparatus for processing a binary video signal having a relatively higher level and a relatively lower level and carrying information of dots to be printed in which said binary video signal being at a relatively higher or lower level for the whole of each bit time to constitute a unit portion of said binary video signal, a unit portion of said binary video signal at one of said levels being representative of one dot, the apparatus comprising:

means for detecting a start of a length of each of those parts of said binary video signal which are at said one level;

means connected with said start detecting means for determining the number of unit portions contained in said each part of said video signal;

means connected with said unit portion number determining means for producing at least one dot pulse for said each part of said video signal, each of said at least one dot pulse having a pulse width smaller than that corresponding to said bit time, the number of said at least one dot pulse being the same as that of said determined number of unit portions; and means connected with said dot pulse producing means for controllably adjusting said pulse width of said dot pulses.

2. An apparatus for processing a binary video signal having a relatively higher level and a relatively lower level and carrying information of dots to be printed in which said binary video signal being at a relatively higher or lower level for the whole of each bit time to constitute a unit portion of said binary video signal, a unit portion of said binary video signal at one of said levels being representative of one dot, the apparatus comprising:

means for detecting a change of said video signal from the other one level to said one level;

means connected with said level change detecting means for determining the number of unit portions contained in each of those parts of said binary video signal which are at said one level;

means connected with said determining means for producing at least one dot pulse for said each part of video signal, each of said at least one dot pulse having a pulse width smaller than that corresponding to said bit time, the number of said at least one dot pulse being the same as that of said determined number of unit portions; and means connected with said dot pulse producing means for controllably adjusting said pulse width of said dot pulses.

3. An apparatus according to claim 2, in which said one level is said relatively higher level.

4. A semiconductor laser printer for recording information of dots carried by a first binary video signal having a relatively higher level and a relatively lower level in which said binary video signal being at a relatively higher or lower level for the whole of each bit time to constitute a unit portion of said binary video signal, a unit portion of said binary video signal at one of said levels being representative of one dot, comprising:

an apparatus for processing said first binary video signal for generating a second binary video signal including pulses of a controllable pulse width each representative of one dot;

said apparatus including means for detecting a start of a length of each of those parts of said binary video signal which are at said one level, means connected with said start detecting means for determining the number of unit portions contained in said each part of said video signal, means connected with said unit portion number determining means for producing at least one dot pulse for said each part of said video signal, each of said at least one dot pulse having a pulse width smaller than that corresponding to said bit time, the number of said at least one dot pulse being the same as that of said determined number of unit portions, and means connected with said dot pulse producing means for controllably adjusting said pulse width of said dot pulses to generate said second video signal;

a semiconductor laser unit for emitting a laser beam to be on-off controlled by said second binary video signal for forming on a light sensitive medium patterns for said information of dots; and means for adjusting an operation current supplied to said semiconductor laser unit to vary the intensity of said laser beam with which dots are formed on said light sensitive medium.

* * * * *